United States Patent
Yokoyama et al.

(10) Patent No.: US 10,728,165 B2
(45) Date of Patent: Jul. 28, 2020

(54) BUFFER CONTROL APPARATUS, COMMUNICATION NODE, AND RELAY APPARATUS

(71) Applicant: DENSO CORPORATION, Kariya, Aichi-pref. (JP)

(72) Inventors: Koichiro Yokoyama, Kariya (JP); Shuichi Nitta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 24 days.

(21) Appl. No.: 15/757,991

(22) PCT Filed: Sep. 14, 2016

(86) PCT No.: PCT/JP2016/077149
§ 371 (c)(1),
(2) Date: Mar. 7, 2018

(87) PCT Pub. No.: WO2017/047657
PCT Pub. Date: Mar. 23, 2017

(65) Prior Publication Data
US 2018/0248814 A1 Aug. 30, 2018

(30) Foreign Application Priority Data
Sep. 14, 2015 (JP) .................. 2015-180649

(51) Int. Cl.
*H04L 12/863* (2013.01)
*H04L 12/28* (2006.01)
(Continued)

(52) U.S. Cl.
CPC .......... *H04L 47/6245* (2013.01); *H04L 12/28* (2013.01); *H04L 12/4625* (2013.01); *H04L 67/12* (2013.01)

(58) Field of Classification Search
None
See application file for complete search history.

(56) References Cited

U.S. PATENT DOCUMENTS 6,400,281 B1 * 6/2002 Darby, Jr. ............... B61L 3/125
246/167 R
6,879,563 B1 4/2005 Tomita et al.
(Continued)

FOREIGN PATENT DOCUMENTS

| JP | 2000244548 A | 9/2000 |
|---|---|---|
| JP | 2006268743 A | * 10/2006 |
| JP | 2009225441 A | 10/2009 |

OTHER PUBLICATIONS

English machine generated translation for JP-2006268743-A. (Year: 2006).*

*Primary Examiner* — James P Duffy
(74) *Attorney, Agent, or Firm* — Harness, Dickey & Pierce, P.L.C.

(57) ABSTRACT

A buffer control apparatus includes an input unit, a buffer unit, a same ID determination unit, an overwriting unit, a storage unit, and an output unit. When a same ID as an ID contained in a message accepted at the input unit is present in messages stored in the buffer unit, the overwriting unit overwrites at least data in a message containing the same ID with data contained in the message accepted at the input unit.

6 Claims, 7 Drawing Sheets

(51) Int. Cl.
*H04L 12/46* (2006.01)
*H04L 29/08* (2006.01)

(56) References Cited

U.S. PATENT DOCUMENTS

2007/0133578 A1* 6/2007 Tani .................... H04L 12/462
  370/401
2009/0210397 A1 8/2009 Nishihashi et al.

* cited by examiner

BUFFER CONTROL APPARATUS, COMMUNICATION NODE, AND RELAY APPARATUS

CROSS REFERENCE TO RELATED APPLICATIONS

This application is a U.S. National Phase Application under 35 U.S.C. 371 of International Application No. PCT/JP2016/077149 filed on Sep. 14, 2016 and published in Japanese as WO 2017/047657 A1 on Mar. 23, 2017. This application is based on and claims the benefit of priority from Japanese Patent Application No. 2015-180649 filed on Sep. 14, 2015. The entire disclosures of all of the above applications are incorporated herein by reference.

TECHNICAL FIELD

The present disclosure relates to a buffer control apparatus, a communication node, and a relay apparatus.

BACKGROUND ART

A communication device includes a buffer to temporarily store a message to be sent or a received message. A FIFO buffer may be used as the buffer of the communication device. As another option, an individual buffer may be provided for each ID contained in a massage (see Patent Literature 1).

PRIOR ART LITERATURE

Patent Literature

Patent Literature 1: JP 2000-244548 A

SUMMARY OF INVENTION

A large number of messages containing a same ID may be transmitted due to a failure in the communication device, a DoS attack, and so on. Inventors of the present disclosure discovered that problems as follows occur in such a case. When a FIFO buffer is used, a large number of messages containing a same ID are stored in the buffer, and a message containing a different ID is lost from the buffer. In the method of providing an individual buffer for each ID, a large memory region is required for the buffers provided corresponding to respective IDs.

In view of the foregoing difficulties, it is objects of the present disclosure to provide a buffer control apparatus, a communication node, and a relay apparatus.

According to an aspect of the present disclosure, a buffer control apparatus includes: an input unit accepting an input of a message containing an ID and data; a buffer unit in which a plurality of messages are stored; a same ID determination unit determining whether a same ID as the ID contained in the message accepted by the input unit is present in the plurality of messages stored in the buffer unit; an overwriting unit overwriting at least data in one of the plurality of messages containing the same ID as the ID contained in the message accepted by the input unit with the data contained in the message accepted by the input unit when the same ID is present; a storage unit newly storing the message accepted by the input unit in the buffer unit when the same ID is absent; and an output unit extracting, from the buffer unit, one oldest message from the plurality of messages stored by the storage unit and outputting the oldest message that is extracted.

According to the above-described buffer control apparatus, when a message having the same ID as the ID contained in the message accepted by the input unit exists in the multiple messages stored in the buffer unit, at least data of the message stored in the buffer unit is overwritten with the data contained in the message having the same ID and accepted by the input unit.

With the buffer control apparatus having the above-described configuration, even when a large number of input messages containing a same ID are inputted into the input unit, the large number of messages containing the same ID are not individually stored in the buffer unit. Thus, the buffer control apparatus is capable of restricting a lost, from the buffer unit, of a stored message containing a different ID from the large number of input messages.

With the buffer control apparatus having the above-described configuration, the buffer control apparatus can update the data included in the message stored in the buffer unit to the latest data. Further, with the buffer control apparatus having the above-described configuration, there is no need to provide one buffer unit to each ID individually. Thus, a memory region used as a buffer unit can be reduced.

According to another aspect of the present disclosure, a buffer control apparatus includes: an input unit accepting an input of a message containing an ID and data; a buffer unit in which a plurality of messages are stored; a same ID determination unit determining whether a same ID as the ID contained in the message accepted by the input unit is present in the plurality of messages stored in the buffer unit; an overwritable ID determination unit determining whether the ID contained in the message accepted by the input unit is a preliminarily set overwritable ID; an overwriting unit overwriting at least data in one of the plurality of messages containing the same ID as the ID contained in the message accepted by the input unit with the data contained in the message accepted by the input unit when the same ID is present and the ID contained in the message accepted by the input unit is determined to be the overwritable ID; a storage unit newly storing the message accepted by the input unit in the buffer unit when the same ID is absent or when the ID contained in the message accepted by the input unit is not the overwritable ID; and an output unit extracting, from the buffer unit, one oldest message from the plurality of messages stored by the storage unit and outputting the oldest message that is extracted.

According to above-described another buffer control apparatus, when a message having the same ID as the ID contained in the message accepted by the input unit exists in the multiple messages stored in the buffer unit and the ID contained in the message is an overwritable ID, at least data of the message stored in the buffer unit is overwritten with the data contained in the message having the same ID and accepted by the input unit.

With the buffer control apparatus having the above-described another configuration, even when a large number of input messages containing a same ID are inputted into the input unit and the inputted ID are overwritable ID, the large number of messages containing the same ID are not individually stored in the buffer unit. Thus, the buffer control apparatus is capable of restricting a lost, from the buffer unit, of a stored message containing a different ID from the large number of input messages.

With the buffer control apparatus having the above-described another configuration, the buffer control apparatus can update the data included in the message stored in the buffer unit to the latest data. Further, with the buffer control apparatus having the above-described another configuration, there is no need to provide one buffer unit to each ID individually. Thus, a memory region used as a buffer unit can be reduced.

With the buffer control apparatus having the above-described another configuration, when a message having the same ID as the ID contained in the message accepted by the input unit exists in the multiple messages stored in the buffer unit but the ID contained in the message is not overwritable ID, data of the message stored in the buffer unit is not overwritten with the data contained in the message having the same ID and accepted by the input unit. In this case, the message accepted by the input unit is stored in the buffer unit. Thus, when the accepted message includes the non-overwritable ID, the buffer control apparatus can store multiple messages having the same ID in the buffer unit.

DESCRIPTION OF REFERENCE SYMBOLS

1: communication system, 3, 5: communication group, 7: relay apparatus, 9: multiplex communication line, 11: ECU, 13: application, 15: relay control unit, 17: routing map, 19: reception buffer control apparatus, 21: transmission buffer control apparatus, 23: reception buffer control apparatus, 25: transmission buffer control apparatus, 27: input unit, 29: storage control unit, 31: search unit, 33: buffer unit, 35: output unit, 37: overwriting permission information table.

EMBODIMENTS FOR CARRYING OUT INVENTION

Embodiments of the present disclosure will be described with reference to the drawings.

First Embodiment

1. Configuration of Communication System 1

Figure 1:
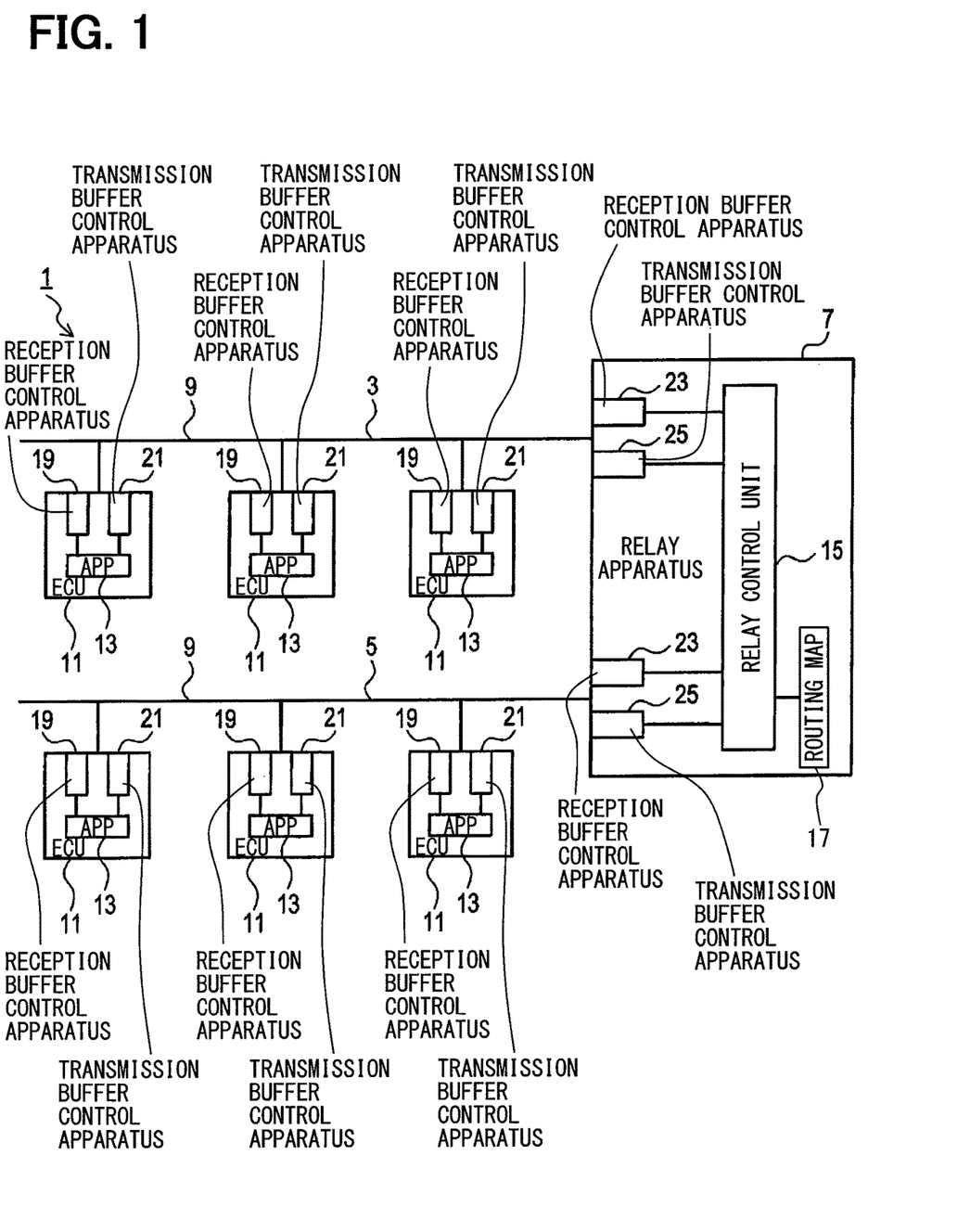
FIG. 1 is a diagram showing a configuration of a communication system.

A configuration of a communication system 1 will be described according to FIG. 1. The communication system 1 is an in-vehicle communication system installed to a vehicle. The communication system 1 is also a multiplex communication system. The communication system 1 includes multiple communication groups 3 and 5 and a relay apparatus 7. Each of the communication groups 3 and 5 includes multiple ECUs 11 connected to a multiplex communication line 9. Each ECU 11 corresponds to a communication node.

The communication system 1 sends and receives a message according to a predetermined protocol. The message includes at least an ID and data. The ID indicates a type of data contained in the message.

The ECU 11 includes an application 13 having a message creating function. The ECU 11 sends a message created by the own application 13 to another ECU 11. The ECU 11 also receives a message sent from another ECU 11 and forwards the received message to the own application 13. The application 13 performs predetermined processing by using the forwarded message.

The relay apparatus 7 is connected to the both communication groups 3 and 5. In a case where a message sender ECU 11 and a receiver ECU 11 belong to different communication groups, the relay apparatus 7 relays the message. The relay device 7 includes a relay control unit 15 and a routing map 17. The relay control unit 15 performs processing related to a relay of a message. In the routing map 17, IDs contained in messages are stored in correspondence with destinations of the respective messages.

Upon receipt of a message from one communication group, the relay control unit 15 reads an ID contained in the message and determines a receiver ECU 11 which is the destination of the message by referring to the routing map 17. Subsequently, the relay control unit 15 sends the message to a communication group to which the receiver ECU 11 belongs.

The ECU 11 also includes a reception buffer control apparatus 19 and a transmission buffer control apparatus 21. The reception buffer control apparatus 19 temporarily store a message received from another ECU 11, and the transmission buffer control apparatus 21 temporarily store a message to be sent to another ECU 11.

The relay apparatus 7 also includes a reception buffer control apparatus 23 and a transmission buffer control apparatus 25 for each communication group. The reception buffer control apparatus 23 temporarily stores a message received from the connected-communication group and later outputs the stored message to the relay control unit 15. The transmission buffer control apparatus 25 temporarily stores a message inputted from the relay control unit 15 and later outputs the stored message to the connected-communication group.

2. Configuration of Reception Buffer Control Apparatus 19

Figure 2:
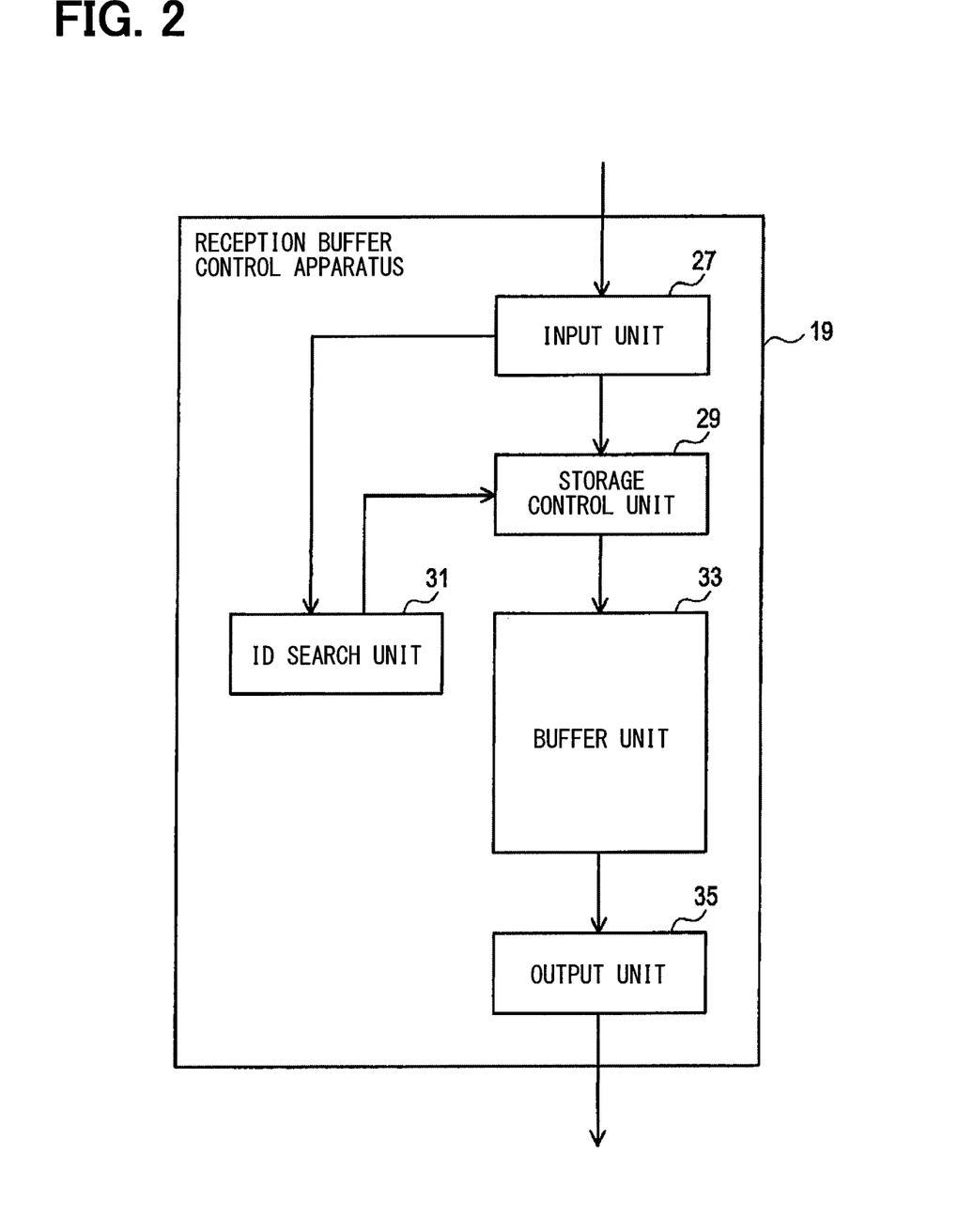
FIG. 2 is a block diagram showing a configuration of a reception buffer control apparatus.

A configuration of the reception buffer control apparatus 19 will be described according to FIG. 2. The transmission buffer control apparatus 21, the reception buffer control apparatus 23, and the transmission buffer control apparatus 25 are configured in a same manner as the reception buffer control apparatus 19.

The reception buffer control apparatus 19 includes a communication IC forming an interface to the multiplex communication line 9, and a microcomputer for control purpose. The reception buffer control apparatus 19 has functions assigned to an input unit 27, a storage control unit 29, an ID search unit 31, a buffer unit 33, and an output unit 35. Functions of the respective units will be described below.

The functions of the respective units are realized by execution of a program preliminarily stored in an internal ROM of the microcomputer using an internal CPU of the microcomputer. The buffer unit 33 is allocated in internal RAM or in an internal registry of the microcomputer. An internal non-volatile memory of the microcomputer other than the ROM or a non-volatile memory or a RAM provided outside the microcomputer in the ECU 11 may be used instead of the internal ROM and RAM.

The ID search unit 31 corresponds to a same ID determination unit, and the storage control unit 29 corresponds to an overwriting unit and a storage unit.

3. Processing Performed by Reception Buffer Control Apparatus 19

Processing performed by the reception buffer control apparatus 19 will be described according to FIG. 3, FIG. 4A, FIG. 4B, FIG. 5A, and FIG. 5B. The following will describe processing executed by the reception buffer control apparatus 19 included in one ECU 11 (hereinafter, referred to as the own ECU 11). Any ECU 11 other than the own ECU 11 is referred to also as another ECU 11 in the following description.

Figure 3:
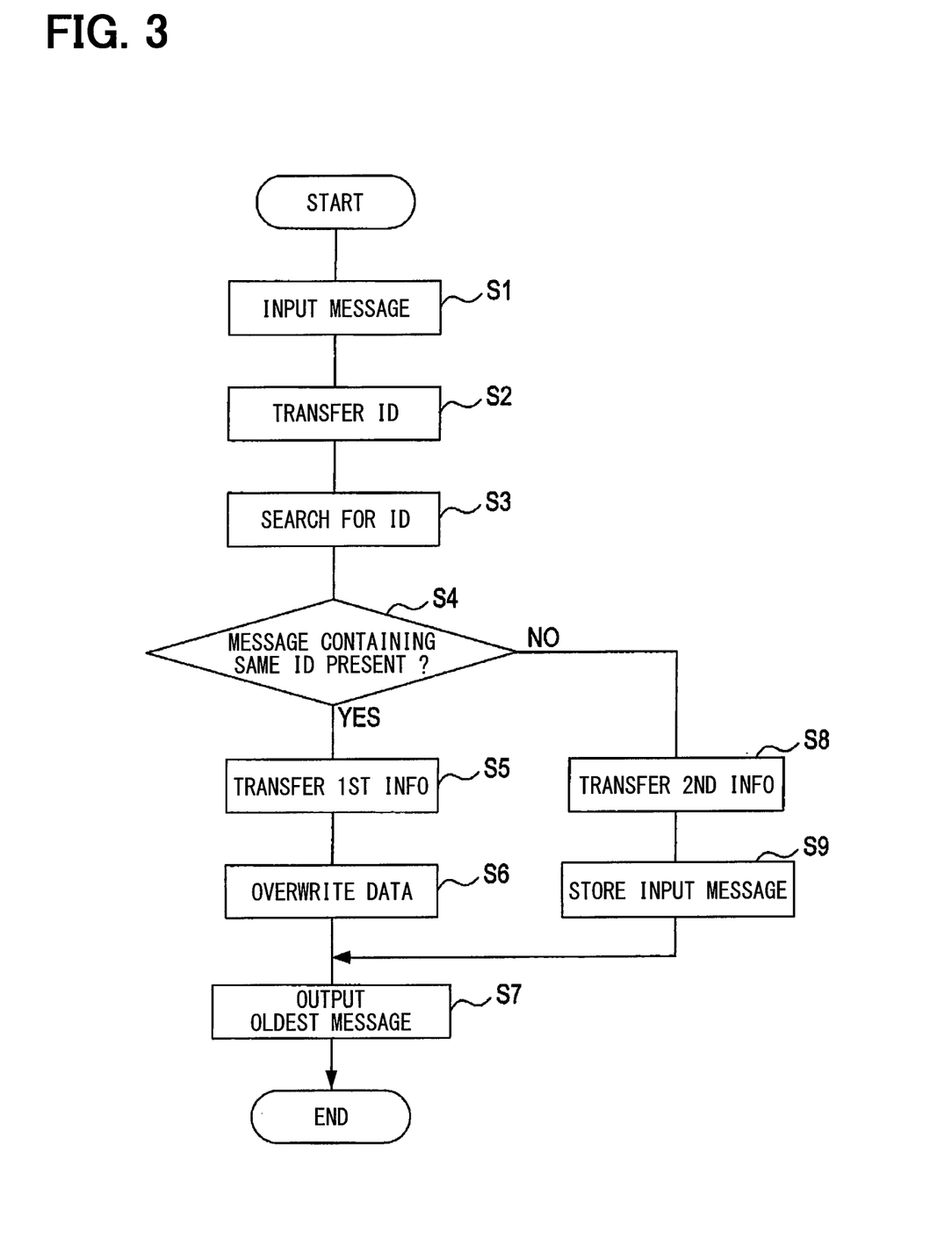
FIG. 3 is a flowchart showing processing performed by the reception buffer control apparatus.

In S1 of FIG. 3, the input unit 27 accepts an input of a message. Hereinafter, the message inputted into the input unit 27 is referred to as the input message. The input message is sent from another ECU 11 to the own ECU 11 which functions as a receiver.

In S2, the input unit 27 transfers an ID contained in the input message (hereinafter, referred to as the input message ID) to the ID search unit 31. The input unit 27 also transfers the input message ID and data contained in the input message (hereinafter, referred to as the input message data) to the storage control unit 29.

In S3, the ID search unit 31 searches for a same ID as the input message ID transferred in S2 through messages stored in the buffer unit 33 (hereinafter, referred to as the stored messages).

In S4, the ID search unit 31 determines whether a same ID as the input message ID is present in the stored messages according to a search result in S3. When the presence of the same ID as the input message ID in the stored messages is determined, advancement is made to S5. When absence of such an ID is determined, advancement is made to S8.

In S5, the ID search unit 31 transfers first information indicating contents (1a) through (1c) as follows to the storage control unit 29:

(1a) the input message ID;
(1b) the presence of a same ID as the input message ID in the stored messages; and
(1c) a storage location of the stored message which contains the same ID as the input message ID (hereinafter, referred to as the stored message containing same ID) in the buffer unit 33.

In S6, the storage control unit 29 identifies the storage location of the stored message containing same ID by using information indicating content (1c). Subsequently, the storage control unit 29 overwrites data in the stored message containing same ID with the input message data.

An example of the processing as above will be described concretely according to a case shown in FIG. 4A and FIG. 4B. In the case shown in FIG. 4A, stored messages M1, M2, ..., Mi, ..., and Mn are stored in the buffer unit 33. Herein, n is a natural number and i is any natural number equal to or greater than 1 and equal to less than n. The messages M1 through Mn are stored in the buffer unit 33 in order of M1, M2, M3, ..., and Mn (hereinafter, the order is referred to as the storing order). The storing order is an order in which input messages are stored by processing in S9 described below. The buffer unit 33 holds the storing order.

Figure 4A:
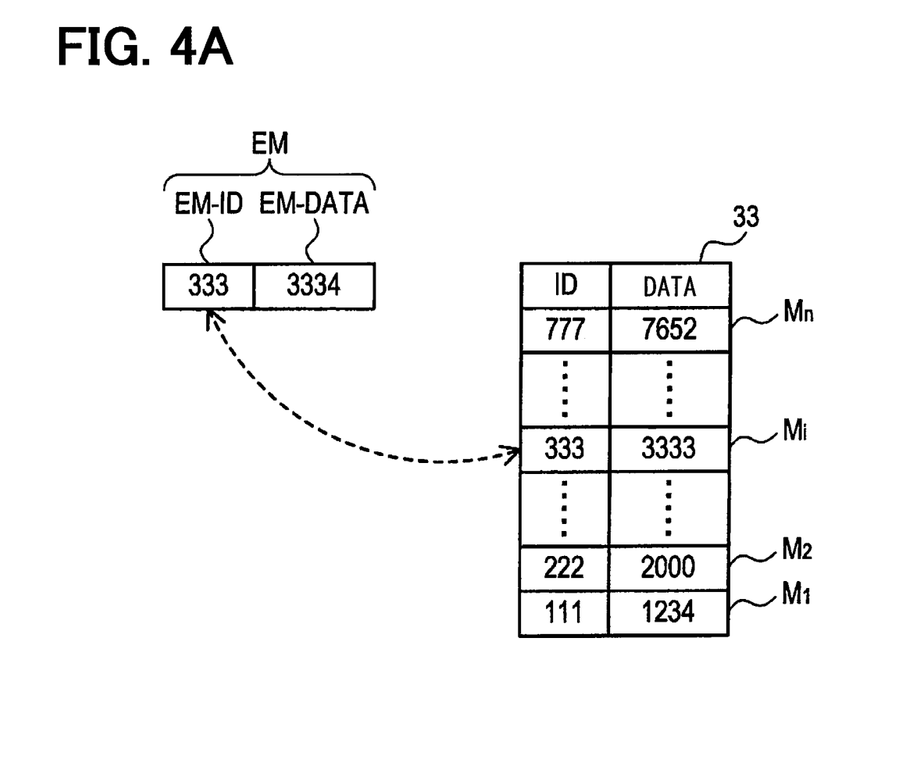
FIG. 4A is a diagram showing a buffer unit and an input message before data is overwritten.
Figure 4B:
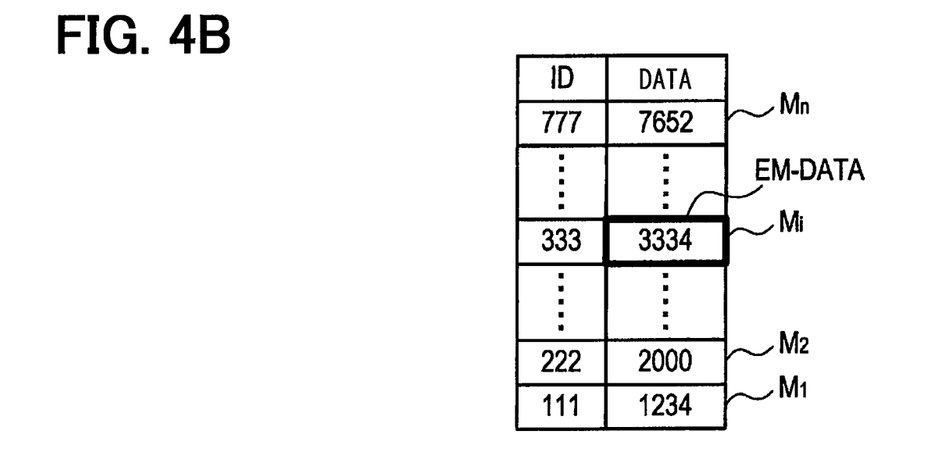
FIG. 4B is a diagram showing the buffer unit after the data is overwritten.

In the case shown in FIG. 4A, a same ID as the input message ID is present in the stored message Mi. In FIG. 4A, EM denotes the input message and EM-ID denotes the input message ID. In the case shown in FIG. 4A, the input message ID is "333".

That is, the stored message Mi is the stored message containing same ID as the input message. In such a case, a positive determination is made in S4, and as is shown in FIG. 4B, the data in the stored message Mi is overwritten with the input message data in S6.

Even when the data is overwritten as above, the number of the stored messages does not change. The storing order of the stored messages M1, M2, ..., Mi, ..., and Mn does not change, either. For example, even when the data in the stored message Mi is overwritten as above, the stored message Mi remains at an i-th position in the storing order.

Referring to FIG. 3 again, in S7, the output unit 35 extracts one oldest stored message recorded at a first position in the storing order, and transfers the extracted message to the application 13 of the own ECU 11. The extracted message is erased from the buffer unit 33.

Meanwhile, when a negative determination is made in S4, advancement is made to S8, in which the ID search unit 31 transfers second information indicating contents (2a) and (2b) as follows to the storage control unit 29:

(2a) the input message ID; and
(2b) the absence of a same ID as the input message ID in the stored messages.

In S9, the storage control unit 29 stores the input message into the buffer unit 33. The input message is newly stored in S9 at a position following all the existing stored messages in the storing order. By storing the input message, the number of the stored messages is increased by one.

The processing as above will be described concretely according to a case shown in FIG. 5A and FIG. 5B. In the case shown in FIG. 5A, the stored messages M1, M2, ..., Mi, ..., and Mn are stored in the buffer unit 33. Herein, n is a natural number, and i is any natural number equal to or greater than 1 and equal to or less than n. The storing order is M1, M2, M3, ..., and Mn.

Figure 5A:
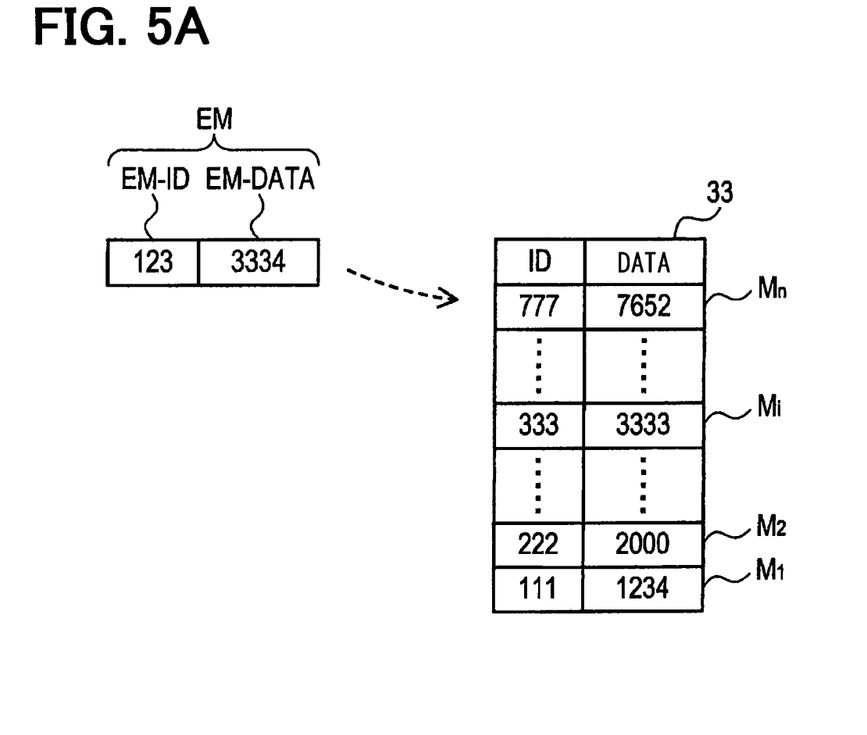
FIG. 5A is a diagram showing the buffer unit before the input message is stored.

In the case shown in FIG. 5A, a same ID as the input message ID is absent in the stored message M1 through Mn. In FIG. 5A, EM denotes the input message and EM-ID denotes the input message ID. In the case shown in FIG. 5A, the input message ID is "123".

Figure 5B:
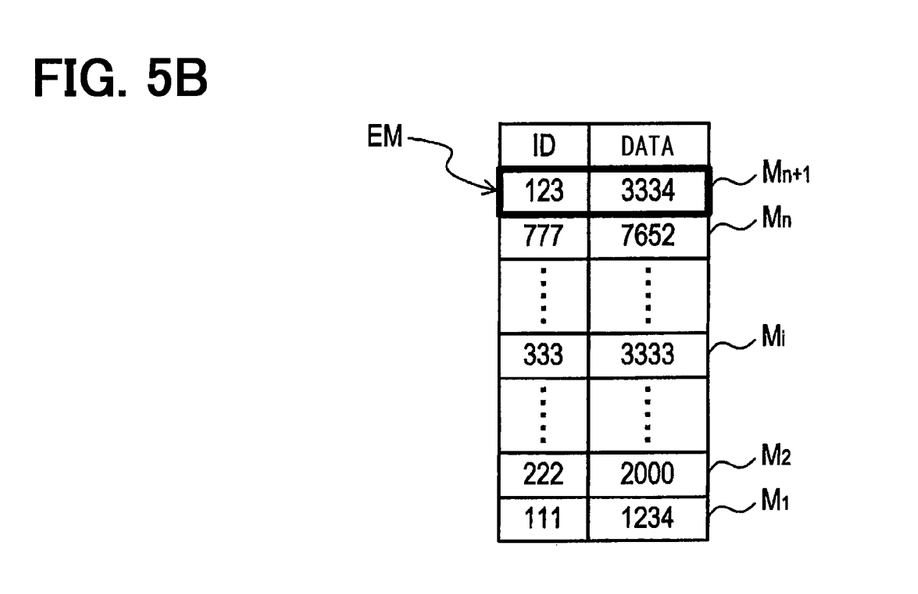
FIG. 5B is a diagram showing the buffer unit after the input message is stored.

Herein, a negative determination is made in S4, and as is shown in FIG. 5B, the input message is newly stored into the buffer unit 33 in S9. The input message is newly stored at a position following all the existing stored messages M1, M2, ..., Mi, ..., and Mn in the storing order, and to be more specific, at an (n+1)-th position in the case shown in FIG. 5B.

The transmission buffer control apparatus 21, the reception buffer control apparatus 23, and the transmission buffer control apparatus 25 also perform processing in a same manner as does the reception buffer control apparatus 19 except for differences as follows. That is, in the transmission buffer control apparatus 21, the input unit 27 accepts an input of a message created by the application 13 in the own ECU 11. In the transmission buffer control apparatus 21, the output unit 35 outputs a message extracted from the buffer unit 33 to another ECU 11.

In the reception buffer control apparatus 23, the input unit 27 accepts an input of a message from the communication group connected to the reception buffer control apparatus 23. In the reception buffer control apparatus 23, the output unit 35 outputs a message extracted from the buffer unit 33 to the relay control unit 15.

In the transmission buffer control apparatus 25, the input unit 27 accepts an input of a message from the relay control unit 15. In the transmission buffer control apparatus 25, the output unit 35 outputs a message extracted from the buffer unit 33 to the communication group connected to the transmission buffer control apparatus 25.

4. Effects Obtained by Reception Buffer Control Apparatus 19

Effects as follows are obtained by the reception buffer control apparatus 19 of the present embodiment. Same effects are obtained also by the transmission buffer control apparatus 21, the reception buffer control apparatus 23, and the transmission buffer control apparatus 25.

(1A) When the stored message containing same ID is present, the reception buffer control apparatus 19 does not store the input message into the buffer unit 33 by the processing in S9. Hence, the number of the stored messages is not increased.

Accordingly, even when a large number of input messages containing a same ID are inputted into the input unit 27 due to, for example, a failure in a communication device or a DoS attack, the number of the stored messages containing the same ID is not increased. Consequently, even when a large number of input messages containing a same ID are inputted into the input unit 27, the reception buffer control apparatus 19 is capable of restricting an inconvenience that a stored message containing a different ID is lost.

(1B) When the stored message containing same ID is present, the reception buffer control apparatus 19 overwrites a data portion of the stored message containing same ID with the input message data. The data in the stored message containing same ID can be thus updated to latest data.

(1C) The reception buffer control apparatus 19 does not necessarily include an individual buffer unit for each ID. Hence, a memory region used as a buffer unit can be reduced.

Second Embodiment

1. Difference from Configuration of First Embodiment

A second embodiment and the first embodiment above are same in fundamental configuration. Hence, a difference will be chiefly described by omitting a description of a common configuration. Reference symbols same as reference symbols used in the first embodiment above denote same or equivalent configurations, and reference should be made to the preceding description.

Figure 6:
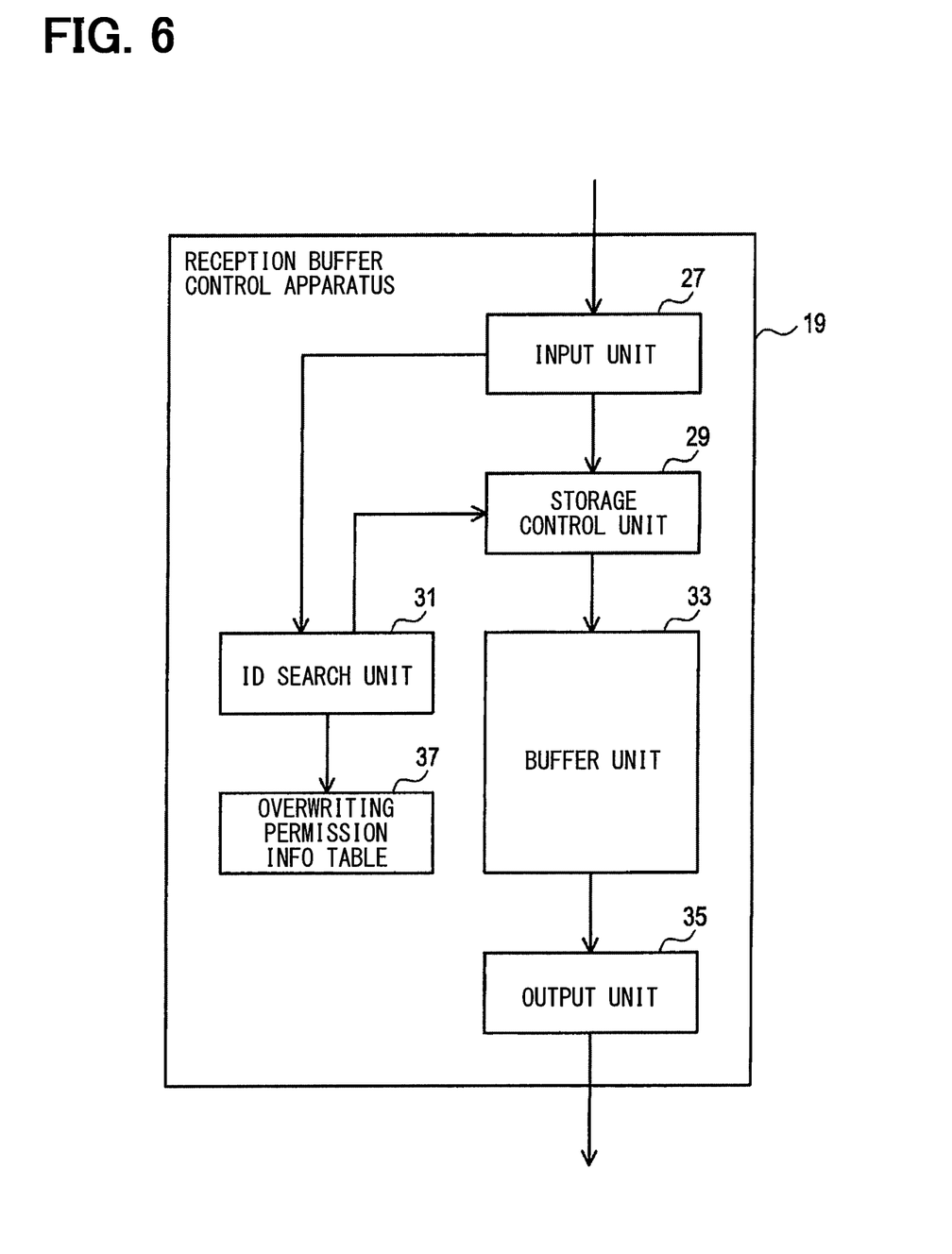
FIG. 6 is a block diagram showing a configuration of a reception buffer control apparatus.

A reception buffer control apparatus 19 has a configuration as shown in FIG. 6. A transmission buffer control apparatus 21, a reception buffer control apparatus 23, and a transmission buffer control apparatus 25 are configured in a same manner as the reception buffer control apparatus 19 of the first embodiment.

The reception buffer control apparatus 19 includes an overwriting permission information table 37 in addition to an input unit 27, a storage control unit 29, an ID search unit 31, a buffer unit 33, and an output unit 35.

The overwriting permission information table 37 includes information indicating whether an ID in question is an overwritable ID or a non-overwritable ID. A specific example of the overwriting permission information table 37 is table in which all IDs are recorded and each ID is recorded as an overwritable ID or a non-overwritable ID.

Another specific example of the overwriting permission information table 37 is a table in which only overwritable IDs out of all the IDs are recorded. In such a case, when an ID in question is recorded in the overwriting permission information table 37, the ID in question is determined to be an overwritable ID. When the ID in question is not recorded in the overwriting permission information table 37, the ID in question is determined to be a non-overwritable ID.

Another specific example of the overwriting permission information table 37 is a table in which only non-overwritable IDs out of all the IDs are recorded. In such a case, when an ID in question is not recorded in the overwriting permission information table 37, the ID in question is determined to be an overwritable ID. When the ID in question is recorded in the overwriting permission information table 37, the ID in question is determined to be a non-overwritable ID.

Another specific example of the overwriting permission information table 37 is a table in which a part of ID information is registered in advance instead of an ID itself and only IDs belonging to an ID group that matches the registered information are recorded. In such a case, when an ID in question belongs to the ID group recorded in the overwritable and non-overwritable table 37, the ID in question is determined to be an overwritable ID. When the ID in question does not belong to the recorded ID group, the ID in question is determined to be a non-overwritable ID.

Another specific example of the overwriting permission information table 37 is a table in which a part of ID information is registered in advance instead of an ID itself and only IDs belonging to an ID group that matches the registered information are not recorded. In such a case, when an ID in question does not belong to the ID group recorded in the overwritable and non-overwritable table 37, the ID in question is determined to be an overwritable ID. When the ID in question belongs to the recorded ID group, the ID in question is determined to be a non-overwritable ID.

The ID search unit 31 corresponds to a same ID determination unit. The ID search unit 31 and the overwriting permission information table 37 correspond to an overwritable ID determination unit. The storage control unit 29 corresponds to an overwriting unit and a storage unit.

2. Processing Performed by Reception Buffer Control Apparatus 19

Figure 7:
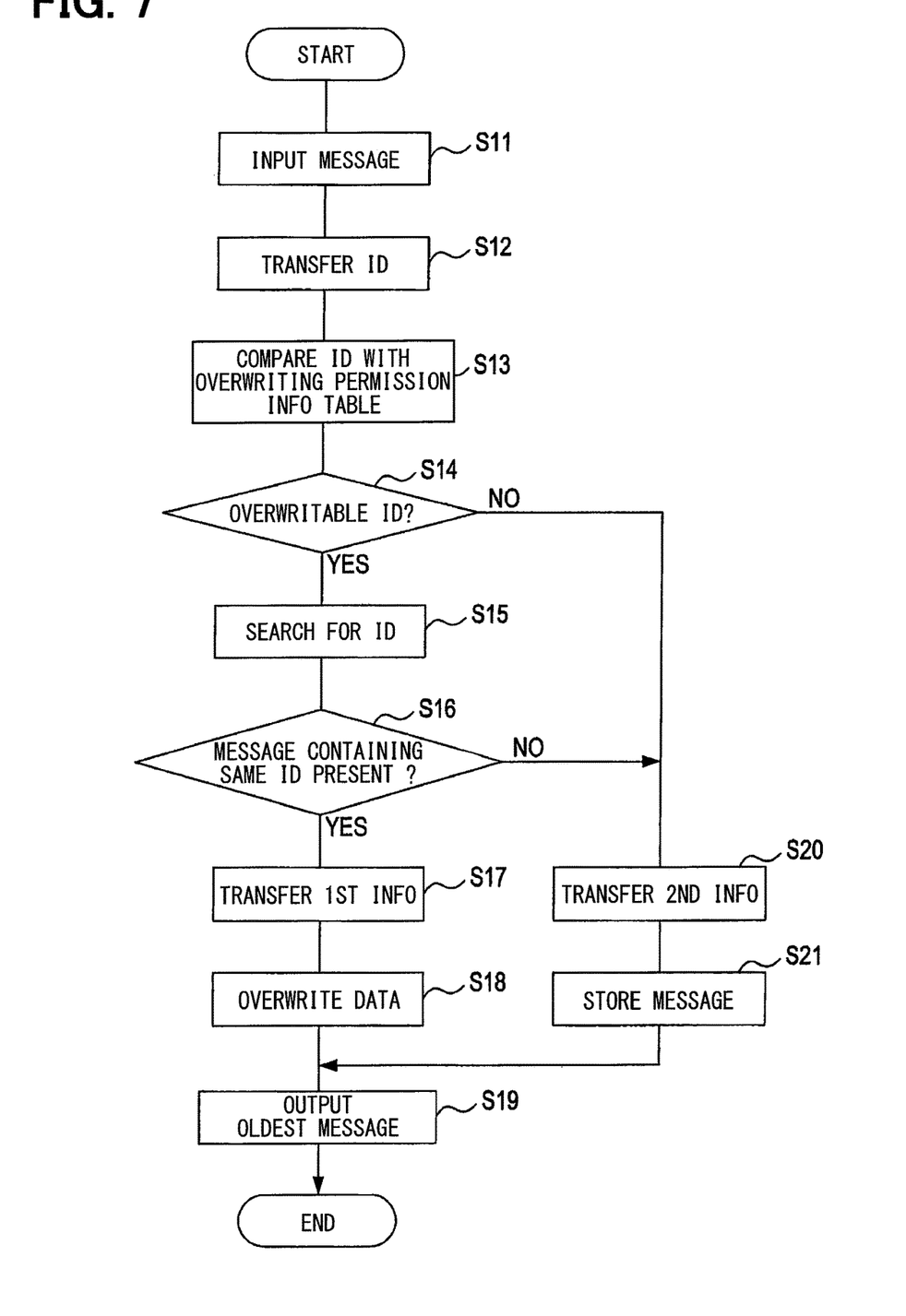
FIG. 7 is a flowchart depicting processing performed by the reception buffer control apparatus.

Processing performed by the reception buffer control apparatus 19 will be described according to FIG. 7. Processing in S11 and S12 of FIG. 7 is same as the processing in S1 and S2 in the first embodiment above.

In S13, the ID search unit 31 compares an input message ID transferred in S12 with a content of the overwriting permission information table 37.

In S14, the ID search unit 31 determines whether the input message ID is an overwritable ID according to a comparison result in S13. When the input message ID is an overwritable ID, advancement is made to S15. When the input message ID is not an overwritable ID, advancement is made to S20.

S15 through S21 are same, respectively, as S3 through S9 in the first embodiment above.

The transmission buffer control apparatus 21, the reception buffer control apparatus 23, and the transmission buffer control apparatus 25 also perform processing in a same manner as does the reception buffer control apparatus 19.

3. Effects Obtained by Reception Buffer Control Apparatus 19

The reception buffer control apparatus 19 of the present embodiment obtains effects as follows in addition to the above-described effect (1C) of the first embodiment above. The transmission buffer control apparatus 21, the reception buffer control apparatus 23, and the transmission buffer control apparatus 25 also obtain same effects.

(2A) When the stored message containing same ID is present and the input message ID is an overwritable ID in a configuration of a simple FIFO buffer, the reception buffer control apparatus 19 does not store the input message into the buffer unit 33 by the processing in S21. Hence, the number of the stored messages is not increased.

Accordingly, even when a large number of input messages containing a same ID are inputted into the input unit 27 due to, for example, a failure in a communication device or a DoS attack, the number of the stored messages containing the ID in question is not increased. Consequently, even when a large number of input messages containing a same ID are inputted into the input unit 27, the reception buffer control apparatus 19 is capable of restricting an inconvenience that a stored message containing a different ID is lost.

(2B) When the stored message containing same ID is present and the input message ID is an overwritable ID in a configuration of a simple FIFO buffer, the reception buffer control apparatus 19 overwrites a data portion of the stored message containing same ID with the input message data. The data in the stored message containing same ID can be thus updated to latest data.

(2C) Even when the stored message containing same ID is present, the reception buffer control apparatus 19 does not overwrite the data by the processing in S18 unless the input message ID is an overwritable ID, and instead stores the input message into the buffer unit 33 by the processing in S21.

Accordingly, multiple messages containing a same ID can be stored in the buffer unit 33 when the ID is not an overwritable ID.

Other Embodiments

While the above has described the embodiments of the present disclosure, the present disclosure is not limited to the embodiments above and can be modified in various manners.

(1) A structure of a message can be set as needed. For example, the message may include another region in addition to an ID and data.

(2) A data range overwritten in S6 or S18 can be set as needed. For example, a portion (for example, an ID) in the stored message other than data may be overwritten, too. Alternatively, the stored message may be entirely overwritten with the input message.

(3) The processing in S7 or S19 may be performed at a time point different from an input time of the message. For example, the processing in S7 or S19 may be performed in every predetermined period.

(4) The reception buffer control apparatus 19 and the transmission buffer control apparatus 21 may be provided to a different communication node (for example, a host computer, a terminal device, a communication device, a switching device, and so on) instead of the ECU 11.

(5) The communication system 1 may be a communication system provided to a subject other than a vehicle (for example, infrastructure, a house, an office, and so on).

(6) The contents (1b) and (1c) forming the first information may be combined into one item of data.

(7) The first information may not include the content (1a). The second information may not include the content (2a). Even in such a case, the storage control unit 29 is capable of performing predetermined processing by using an ID obtained from the input unit 27.

(8) Functions performed by the reception buffer control apparatus 19, the transmission buffer control apparatus 21, the reception buffer control apparatus 23, and the transmission buffer control apparatus 25 may be provided by a hardware as a single or multiple ICs or the like, either entirely or in part.

(9) Functions of a single component in the embodiments above may be allocated to multiple components or functions of multiple components may be intensively allocated into a single component. A part of the configurations of the embodiments above may be omitted. At least a part of the configurations of the embodiments above may be added to or replaced with the configuration of any other embodiment. All modifications within a technical ideal specified by the language in the appended claims are included in embodiments of the present disclosure.

(10) Besides the reception buffer control apparatus 19, the transmission buffer control apparatus 21, the reception buffer control apparatus 23, and the transmission buffer control apparatus 25 (hereinafter, referred to collectively as the buffer control apparatus) described above, the present disclosure may be realized in various manners, including a system including the buffer control apparatus as a component, a program causing a computer to function as the buffer control apparatus, a medium recording the program, a message storing method, and so on.

What is claimed is:

1. A buffer control apparatus, comprising:
   an input unit accepting an input of a message containing an ID and data;
   a buffer unit in which a plurality of messages are stored;
   a same ID determination unit determining whether a same ID as the ID contained in the message accepted by the input unit is present in the plurality of messages stored in the buffer unit;
   an overwritable ID determination unit determining whether the ID contained in the message accepted by the input unit is a preliminarily set overwritable ID;
   an overwriting unit overwriting at least data in one of the plurality of messages containing the same ID as the ID contained in the message accepted by the input unit with the data contained in the message accepted by the input unit when the same ID is present and the ID contained in the message accepted by the input unit is determined to be the overwritable ID;
   a storage unit newly storing the message accepted by the input unit in the buffer unit when the same ID is absent or when the ID contained in the message accepted by the input unit is not the overwritable ID; and
   an output unit extracting, from the buffer unit, one oldest message from the plurality of messages stored by the storage unit and outputting the oldest message that is extracted;
   an overwriting permission information table in which information indicating whether each ID is an overwritable ID or a non-overwritable ID is recorded in advance,
   wherein the overwritable ID determination unit determines whether the ID contained in the message accepted by the input unit is the overwritable ID based on the overwriting permission information table.

2. A communication node comprising:
   the buffer control apparatus according to claim 1,
   wherein the communication node temporarily stores a transmission message or a reception message using the buffer control apparatus.

3. The communication node according to claim 2,
   wherein the communication node is included in a communication system of a vehicle.

4. A relay apparatus comprising:
the buffer control apparatus according to claim 1,
wherein the relay apparatus temporarily stores a message to be relayed using the buffer control apparatus.

5. The relay apparatus according to claim 4,
wherein the relay apparatus is included in a communication system of a vehicle.

6. The buffer control apparatus according to claim 1, wherein
the output unit extracts and outputs the plurality of messages stored in the buffer unit in order from the oldest message,
the overwriting unit maintains a storing order of the one of the plurality of messages including the overwritten data at a storing order before overwritten, and
the storing unit sets a storing order of the message that is newly stored at a position following all of the plurality of messages which has already been stored in the buffer unit.

\* \* \* \* \*